United States Patent [19]

Maglica et al.

[11] Patent Number: 5,128,841
[45] Date of Patent: * Jul. 7, 1992

[54] FLASHLIGHT HOLDER CLAMP ASSEMBLY

[75] Inventors: Anthony Maglica, Ontario; Armis L. Lewis, Cucamonga; Fred R. McAlister, Chino, all of Calif.

[73] Assignee: Mag Instrument, Inc., Ontario, Calif.

[*] Notice: The portion of the term of this patent subsequent to Dec. 25, 2007 has been disclaimed.

[21] Appl. No.: 764,148

[22] Filed: Sep. 20, 1991

Related U.S. Application Data

[63] Continuation of Ser. No. 537,447, Jun. 13, 1990, Pat. No. 5,062,026, which is a continuation-in-part of Ser. No. 285,734, Dec. 16, 1988, Pat. No. 4,980,805.

[51] Int. Cl.$^5$ .............................................. F21V 33/00
[52] U.S. Cl. ...................................... 362/72; 362/190; 362/191; 362/421; 248/181; 248/288.3; 403/130
[58] Field of Search ................... 362/61, 72, 190, 191, 362/418, 421; 248/181, 288.3; 403/90, 122, 130, 131, 141, 142

[56] References Cited

U.S. PATENT DOCUMENTS

| | | | |
|---|---|---|---|
| 926,114 | 6/1909 | Hall | 362/421 |
| 958,052 | 5/1910 | Williams | 403/142 |
| 1,186,428 | 6/1916 | Newman | 362/421 |
| 1,722,773 | 7/1929 | Stewart . | |
| 2,029,532 | 2/1936 | Karcher | 287/12 |
| 2,442,736 | 6/1948 | Valentine | 248/124 |
| 3,539,234 | 11/1970 | Rapata | 308/238 |
| 3,584,822 | 6/1971 | Oram | 362/421 |
| 3,843,083 | 10/1974 | Angibaud | 248/229 |
| 4,321,660 | 3/1982 | Sokol | 362/421 |
| 4,357,651 | 11/1982 | Mayer | 362/275 |

Primary Examiner—Ira S. Lazarus
Assistant Examiner—Sue Hagarman
Attorney, Agent, or Firm—Lyon & Lyon

[57] ABSTRACT

A flashlight holder clamp assembly having a mounting bracket which contains one or, optionally, two elastomeric substantially spherical gripping members having a centrally disposed cylindrical channel therein for receiving a portion of the barrel of a small flashlight and for receiving a cylindrical support member. The gripping members also define a plurality of uniformly spaced longitudinal slots which communicate along their inner ends with the central channel so as to allow the gripping member to be uniformly constricted by the mounting bracket upon clamping the flashlight holder clamp assembly to a cylindrical member, such as a bicycle handlebar. The end of the flashlight holder clamp assembly which contains the spherical gripping member has two or four apertures formed therein to accommodate the portions of the flashlight barrel projecting outwardly from the spherical gripping member and allowing the flashlight to be directed in any one of four general directions, either perpendicular to a longitudinal direction of the bicycle handlebars or in a direction along the longitudinal direction of the bicycle handlebars. The lower portion of the flashlight holder clamp assembly defines a pair of cooperating gripping surfaces which clamp onto the tubular member as the mounting bracket is tightened about the spherical gripping member by a suitable tightening means, or may also have two or four apertures to accommodate the support member and to allow the mounting bracket to be adjusted rotationally about the axis or perpendicularly to the axis of the support member.

1 Claim, 5 Drawing Sheets

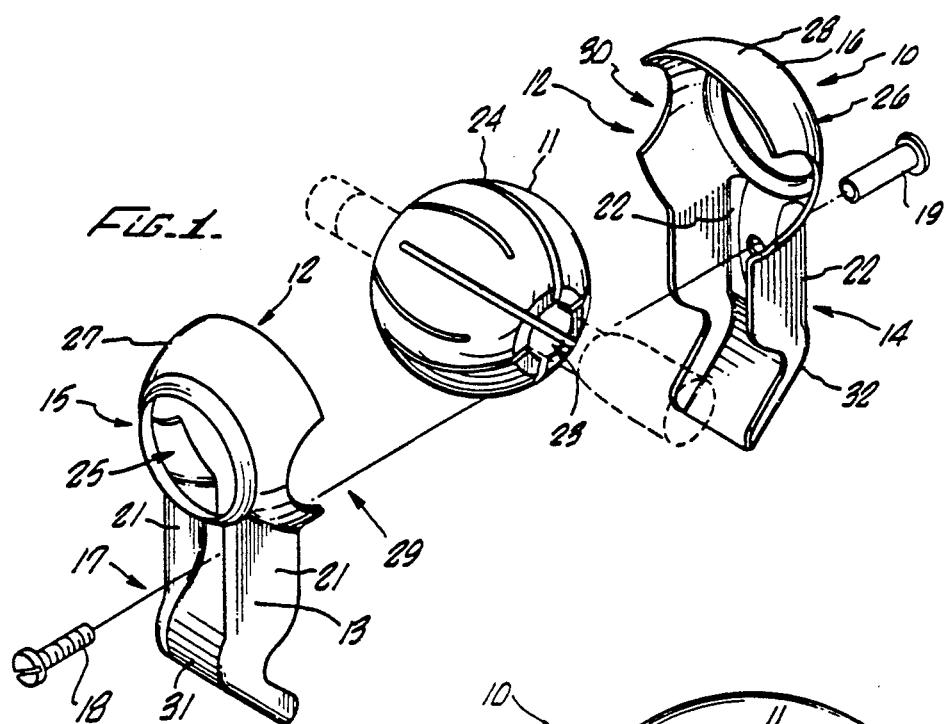
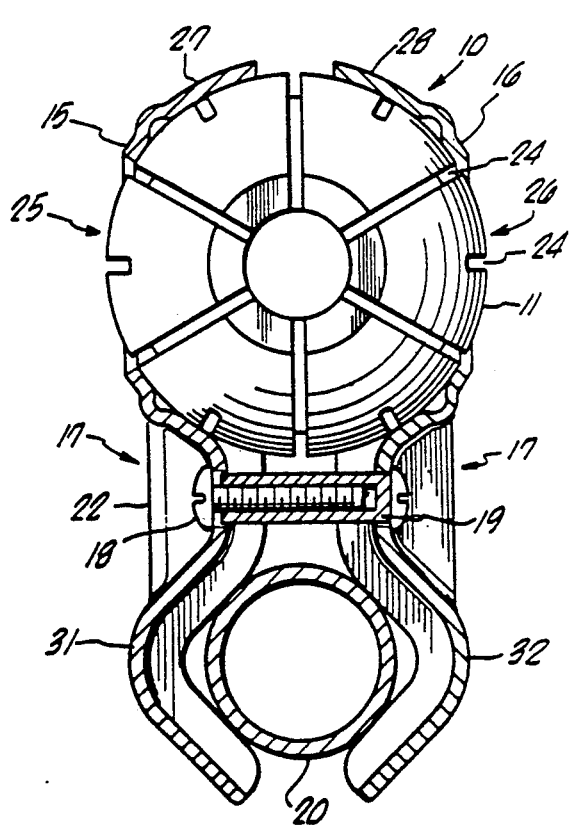
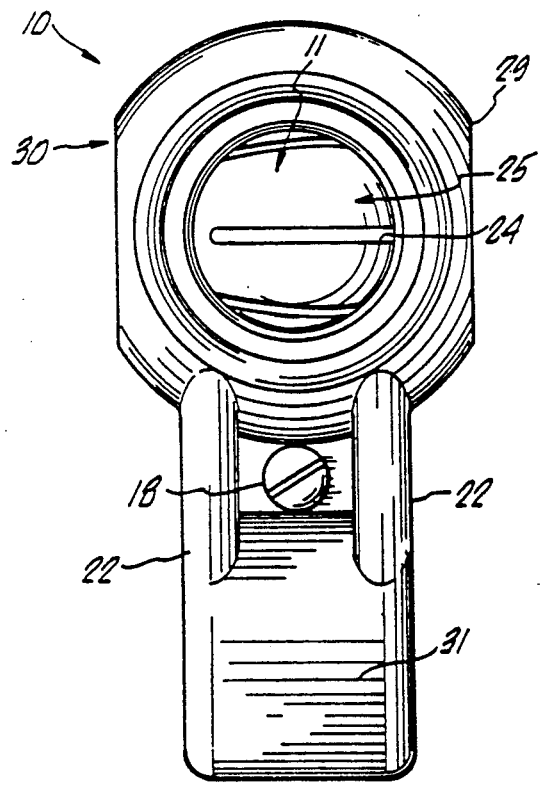

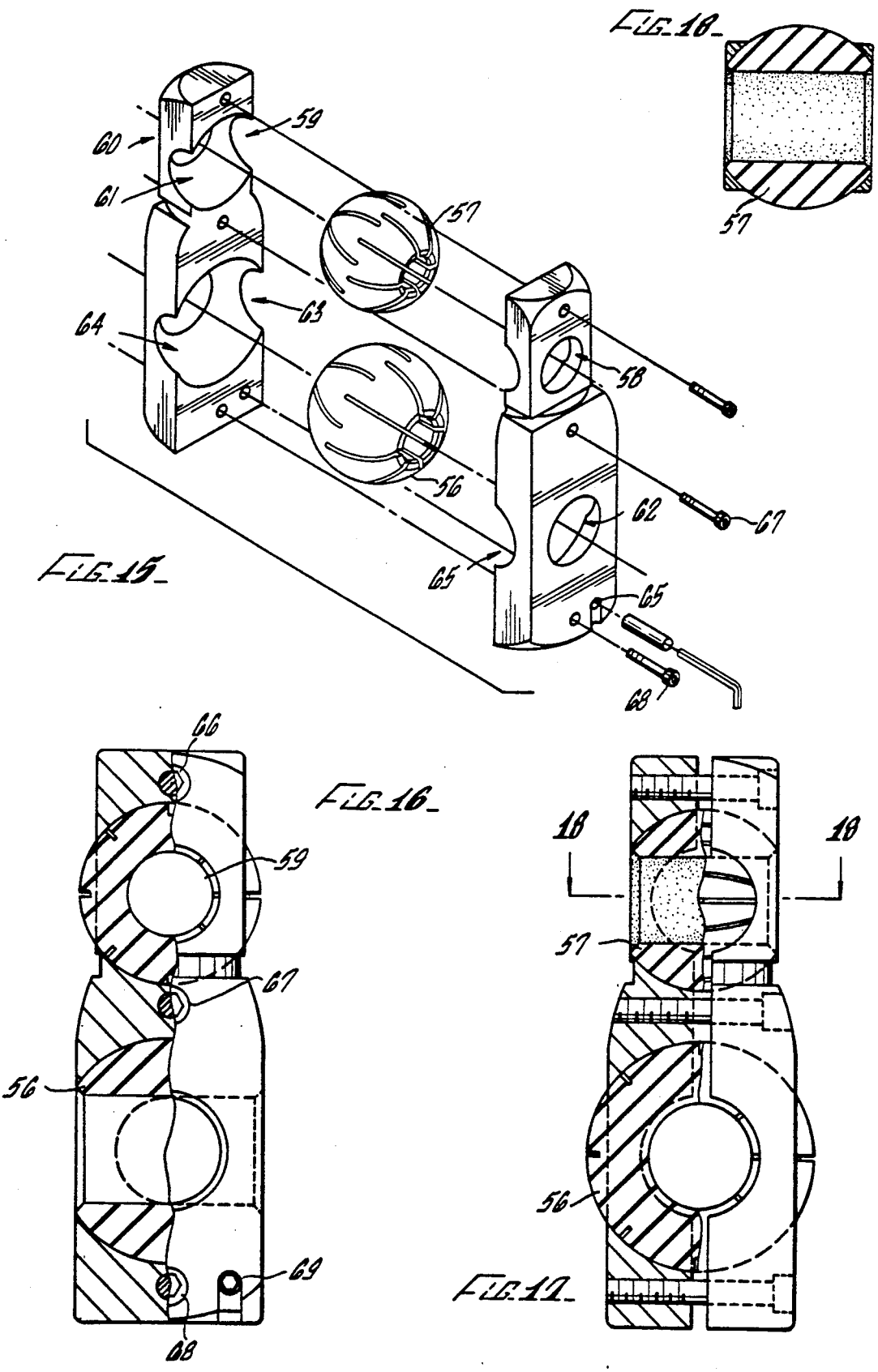

5,128,841

1

FLASHLIGHT HOLDER CLAMP ASSEMBLY

BACKGROUND

This application is a continuation of Ser. No. 537,447, filed Jun. 13, 1990 U.S. Pat. No. 5,062,026 which is a continuation-in-part of Ser. No. 285,734, filed Dec. 16, 1988, and which issued as U.S. Pat. No. 4,980,805 on Dec. 25, 1990.

This invention relates to devices for holding a flashlight securely and for aldso clamping flashlight with its holder onto a tubular shaped member such as a bicycle handlebar, backpacking frame, etc. The invention is primarily intended for use with a miniature, hand held flashlight of the tape described in U.S. Pat. Nos. 4,577,263; 4,658,336; 4,899,265; 4,656,565 or 4,851,974.

Hand held flashlights of various sizes, shapes, and containing various features are well known. It is also well known that bicycles may be equipped with lights for use in night time cycling. It would therefore be highly desirable to provide a clamp assembly by which a flashlight could be secured to the handlebars of a bicycle. Such a clamp assembly should be economical to manufacture and be readily adjustabe. It would also be desirable to provide an assembly which has an adjustable mounting for a flashlight for use on other support structures where the axis of the tubular support structure is parallel to the axis of the barrel of the flashlight, such as for use in conjuction with a rifle. It would also be desirable to provide an assembly which has the capability of adjusting the angle of the clamp itself with respect both to hte support structure and with respect to the flashlight. Such assemblies are described herein.

OBJECTS OF THE INVENTION

It is an object of the present invention to provide a clamp for securely holding a hand held flashlight and for clamping the hand held flashlight at an appropriate location of a bbicycle at one end and for holding and orienting a dry cell flashlight at its other end to provide for lighting a pathway ahead of the bicycle.

It is further object of the present invention to provide a portable flashlight holder clamp for clamping onto a tubular shaped object at one end and for holding a flashlight at its other end whereby the flashlight holder end may be oriented so that the flashlight shines in either direction of the tubular member or in a direction substantially perpendicular to the tubular member.

It is a further object of the invention to provide a flashlight holder clamp which is adjustable to provide for varying the angle that the beam of light from the flashlight is directed with respect to a predetermined reference direction.

It is a further object of the invention to provide for a flashlight holder clamp in which the flashlight may be adjusted horizontally and/or vertically within the clamp and/or in which the clamp itself may be adjusted rotationally or perpendicularly with respect to the axis of the support structure to which it is attached.

SUMMARY OF THE INVENTION

By the following description flashlight holder clamps are described which accomplish the above aforementioned objects and which provides for an adjustable, portable means for holding a hand held type flashlight at one of its ends and for clamping onto a structural member, such as bicycle handlebar, at its other end.

2

One flashlight holder clamp assembly of the present invention includes a truncated spherical gripping member adapted to fit about a portion of the barrel the flashlight, a mounting bracket adapted to fit about the spherical gripping member and to clamp onto the handlebar or other support member to which the assembly is to be secured, and a fastening member for drawing the mounting bracket tightly about the gripping member and the support member. Upon tightening the fastening member, the assembly is secured to the support member, such as for example, a bicycle handlebar, and the gripping member is constricted about the flashlight barrel to secure the flashlight in place in a desired angular orientation with respect to the support member.

The speherical gripping member also defines a pluralith of uniformly spaced longitudinal slots therein which communicate along their inner ends with the central cylindrical channel therein to provide uniform construction of the gripping member about the flashlight. The spherical gripping member is contained within an upper region of the mounting bracket defined by an upper forward portion thereof and a upper rearward portion wherein the inner periphery of the adjacent portioins defines a curvature to smoothly adjoin the outer periphery of the spherical portion of the gripping member such that upon drawing the two portions together about the gripping member, the gripping member is constricted about the flashlight barrel. The adjacent upper forward and upper rearward portions of the mounting bracket also defines two perpendicularly disposed pairs of aligned apertures therein; a forward and rearward facing pair and lateral facing pair. A selected one of the pairs of apertures receives the portion of the flashlight barrel protruding from the spherical gripping member and thereby allows the flashlight to be held by the gripping member within the mounting bracket in a selected orientation with respect to the support member.

The mid region of the forward and rearward portions of the mounting bracket provide for an attaching and tightening means such as for example a male/female screw. The lower ends of the forward and rearward portions of the mounting bracket are configured to fit the handlebar such that upon tightening of the male/female screw, the forward and rearward positioins of the mounting bracket are drawn together, constricting the spherical gripping member in the upper portion thereof, while the lower ends of the bracket are drawn tightly about the support member, thereby sucureing the flashlight in place on the support member. Prior to tightening of the screw fastener, the gripping member with the flashlight protruding therefrom is rotated within the upper region of the mounting bracket to bring the flashlight into the desired angular oreintation with respect to the support member. Tightening of the screw fastener secures the flashlight in place.

The forward and rearward facing apertures in the upper forward and upper rearward portions of the mounting bracket permit orientations of the gripping member and the flashlight as that the beam of light may be directed generally perpendicular in either a forward or rearward direction from the longitudinal axis of a support member, such as the bicycle handlebar. The allowable rotational movement of the gripping member within the mounting bracket permits the gripping member to be oriented so that the beam of light can be readily adjusted upwardly, downwardly or to the left or to the right from a direction precisely perpendicular to the longitudinal direction of the handlebar. It should also be noted that the lateral apertures formed by the upper forward and upper rearward section also provide for orientation of the ball so that the flashlight may be pointed in either a forward or rearward direction along the longitudinal direction of the tubular member.

In other embodiments, the adjustable mounting bracket have provision for only a forward and rearward facing pair of aligned apertures for receiving the flashlight barrel and only a lateral facing pair of aligned apertures for clamping on to a support structure. Such an embodiment would be primarily intended for use on a bicycle.

Also, in another embodiment the upper portion as well as the lower portion of the adjacent mounting clamp are provided with spherical gripping members, so that a predetermined range of vertical and/or horizontal adjustment of the flashlight with respect to the clamp and radial and other adjustment of the clamp with respect to the support stucture may be achieved. In this embodiment a upper and lower pair of aligned apertures are oriented 90° with respect to each other.

In another embodiment, there are two pairs of upper aligned apertures oriented 90° with respect to each other and two pairs of lower aligned apertures oriented 90° with respect to each other. In this embodiment, spherical gripping members are provided both for the upper portions and for the lower portion. This embodiment provides for the greatest flexibility and degree of adjustment of direction of the flashlight beam with respect to the support structure.

The gripping sphere preferably is made of a plastic material that has good strength, elasticity, and forming characteristics, such as one of many nylon based materials commerically available. The mounting bracket may be made of metal, or may also be made of plastic materials. The fastener may be conventional male/female screw fastener, or may be any one of a number of conventional fastening means such as thumb screw, wing nut, or allen socket type screw. In the preferred embodiments the flat in the head of the screw is sized to accommodate a coin, such as a U.S. quarter, or other common coin depending on the country of interest, so that the coin may be used as a screwdriver.

BRIEF DESCRIPTION OF THE DRAWINGS

FIG. 1 is an esxploded perspective view of a flashlight holder clamp assembly of the present invention.

FIG. 2 is a cross sectional, side view of the FIG. 1 assembly.

FIG. 3 is a side view of the FIG. 1 assembly taken at 90° from the FIG. 2 view.

FIG. 15 is an exploded perspective view of a fourth preferred embodiment of the flashlight holder clamp assembly of the present invention.

FIG. 16 is a side elevation, partial section view of the FIG. 15 assembly.

FIG. 17 is a front elevation, partial section view of FIG. 15 assembly. FIG. 18 is a horizontal, section view of the figure assembly taken along line 18—18 of FIG. 17.

DETAILED DESCRIPTION OF THE PREFERRED EMBODIMENTS

Figure 4:
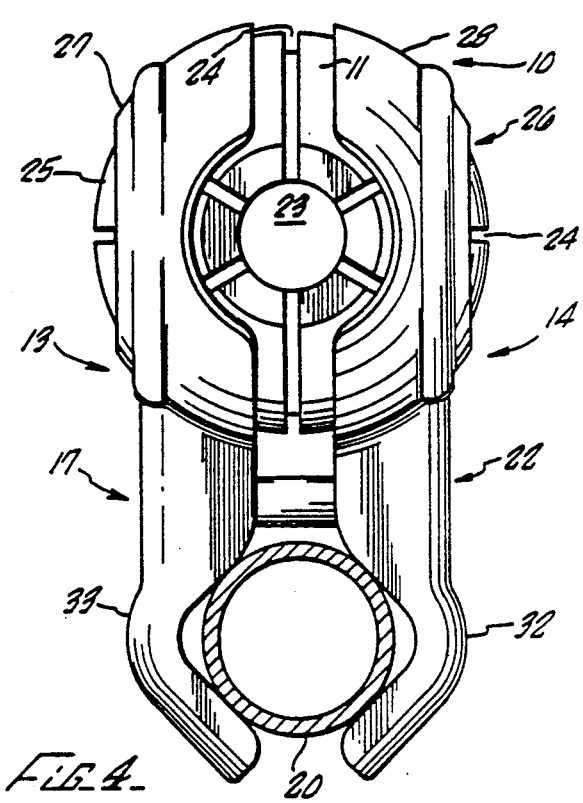
FIG. 4 is a side view of the FIG. 1 assembly taken at the same angle as the FIG. 2 view.
Figure 5:
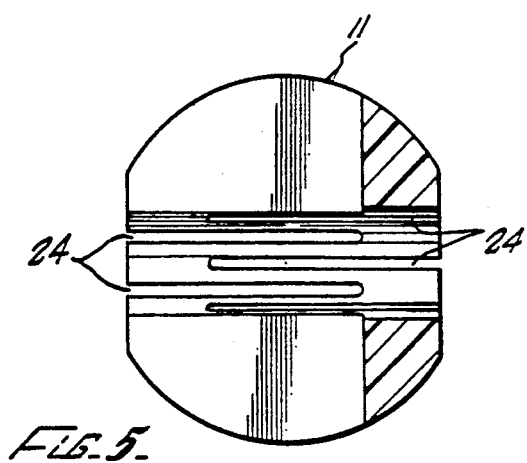
FIG. 5 is sa partial cross sectional, top view of the gripping sphere of the present invention.
Figure 6:
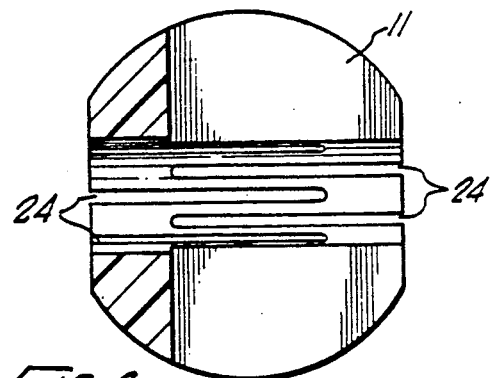
FIG. 6 is a partial cross sectional, bottom view of the gripping sphere of the present invention.

By reference to FIGS. 1-18 preferred embodiments of the present invention will be described.

Referring to FIGS. 1, 2 and 3, an exploded perspective view, a cross sectional, side view and a side view of a first embodiment of the present invention is shown generally at 10. The flashlight holder clamp assembly generally comprises a truncated spherical gripping member 11 and a mounting bracket 12 having a first member 13 and a second member 14. The gripping member 11 is preferably made of a plastic material such as one of the nylon based materials commerically available. Because the truncated spherical gripping member 11 functions to close down upon or constrict the flashlight barrel upon tightening of the mounting bracket 12, virtually any other material of construction for the gripping member which will permit this function is acceptable for purposes of this invention. Shown in FIG. 1 in phantom is a flashlight positioned within the spherical gripping member 11. The spherical gripping member 11 is contained within the upper regions of a forward portion 15 of the first member 13 and rearward portion 16 of the second member 14 of the mounting bracket 11. The mounting bracket 12 has a mid-region 17 for containing a fastener such as a male/female screw fastener shown with male portion 18 and female portion 19 for drawing together the forward and rearward portion of the mouning bracket 12 about the gripping member 11 and a bicycle handlebar, as will be described. The mounting bracket 12 also has a lower forward and rearward portion generally shown as clamping around a bicycle handlebar 20 or other tubular member as shown in FIG. 2. Reinforcing ribs 21, 22 provide and additional measure of support between the upper and lower regions of the first and second members 13 and 14 of the mounting bracket 12. In the preferred embodiments the tubular member 20 is intended to be a conventional handlebar of a bicycle along the region where the handlebar extends longitudinally in a direction perpendicular from the straight-ahead path of the bicycle.

As mentioned above the spherical gripping member is preferably made of a plastic material. The gripping member has a centrally disposed cylindrical channel extending therethrough of sufficient diameter to accommodate a flashlight barrel. In order to accommodate different sized flashlight barrels, as for example to accommodate an AA or AAA flashlight barrel, gripping member 11 may be constructed with different channels 23 of varying cross-sectional diameters but having the same outer diameter in order to fit snugly within the mounting bracket 12. Alternatively the spherical gripping member 11 may be constructed with a large channel diameter and one of more inserts of the same or equivalent material may be provided so that the insert will fit into the channel 23 with the timer diameter of the insert being sized to accommodate the barrel of a flashlight of chosen size. Also, the spherical gripping member 11 has a plurality of uniformly spaced longitudinal slots 24 cut into the body of the gripping member 11 to provide for even constriction, i.e., distribution of the clamping, or holding force upon the flashlight barrel with tightening of the male/female screw fastener portions 18, 19. It should be noted that the flashlight mounting bracket of the present invention, and in particular the slots 24 of the spherical gripping member 11, may be presented in a number of aesthetically pleasing ways. For example, a preferred embdodiment of the flashlight holder clamp assembly of the present invention is shown in design patent of U.S. Pat. No. Des. D308,731, entitled Flashlight Holder Clamp Assembly.

The upper portions of the mounting bracket 12 are provided with a pair of circular axially aligned apertures 25 and 26 with aperture 25 being disposed in the forward body portion 27 and aperture 26 being disposed in the rear body portion 28, as seen in FIGS. 1-2. The left and right sides of each of the forward body portion 27 and rearward body portion 28 are formed so that upon assembly, two axially aligned side or lateral apertures 29 and 30 are formed between the forward and rearward body portions 27 and 28 witht the central common axis of apertures 29 and 30 being perpendicular to the central common axis of apertures 25 and 26. The forwardly and rearwardly facing apertures 25 and 26 are preferably of the same diameter s the perpendicularly disposed apertures 29 and 30. To allow for pivotal adjustment of the gripping member 11 and attached flashlight within the mounting bracket 32, the diameter of each of apertures 25, 26, 29 and 30 is larger thant the cross-sectional diameter of the channel 23 in the gripping member 11. Through this configurtion, the flashlight shown in phantom lines in FIG. 1 extends throught the channel 23 in the truncated spherical gripping member 11 and protrudes outwardly from the clamp assembly through either aligned apertures 25 and 26 or 29 and 30, depending on the desired orientation of the flashlight with respect to the handlebar 20.

In use, the flashlight to be carried by the assembly is inserted through the cylindrical channel 23 in the gripping member 11. The mounting bracket 12 is then placed about the gripping member 11 and the handlebar 20 with the barrel of the flashlight aligned with an extending through either aligned apertures 25 and 26 or 29 and 30 depending on the desired orientation with respect to the handlebar 20. On a bicycle handlebar, the flashlight would normally point forwardly through aperture 25. In FIG. 1 the phantom flashlight and gripping member 11 are shown oriented at a right angle from a normal orientation. The fastening members 18 and 19 are then tightened, constricting the spherical gripping member 11 about the barrel of the flashlight, securing the gripping member in place between the upper portions 27 and 28 of the mounting bracket 32 and tightening the lower portions 31 and 32 of the mounting bracket 12 about the handlebar 20. To adjust the angle of the flashlight beam, it is only necessary to loosen the fastening members 18, 19 which relieves the pressure extended by the mounting bracket 12 on the gripping member 11, allowing the flashlight and gripping member to be rotated within and with respect to the mounting bracket to the desired orientation. Retightening the fastening members 18, 19 secures the gripping member 11 and flashlight in the desired orientation. The adjustment provided by this assembly is limited by the diameter of the aligned apertures in the mounting bracket to the maximum allowable deviation of the flashlight from the central axis of the aligned apertures, so that the flashlight barrel will abut the edge of the wall of the apertures through which the flashlight extends. Such deviation, however, allows more than ample adjustment of the flashlight so that it can be rotated to point at an angle less than the horizontal direction and thus focus on a point along the straight ahead path of the bicycle. The spherical gripping member may also be rotated so that the channel 23 and, thus the flashlight, point in a direction along the longitudinal direction of the tube 20. In such a mounting, the flashlight would be mounted within the assembly such that is would extend through side apertures 29 and 30 in the mounting bracket as opposed to apertures 25 and 26 for a forward pointing securement.

It is also within the scope of the invention that filters, such as a red, yellow or green filter may be used in conjunction with the flashlight and that the flashlight placed in the flashlight clamp assembly of the present invention may be used to perform a safety, or warning function, as well as an illuminating function.

Although the flashlight mounting assembly of the present invention is intended primarily for use on bicycle handlebars to provide for illumination of the bicycle path during darkness, numerous other uses may be made of the flashlight holder clamp of the present invention. For example it may be used on backpack frames and as an aid to illumination or for providing warning illumination in conjunction with virtually any other device, member, or surface onto which the clamp may be fastened.

Figure 7:
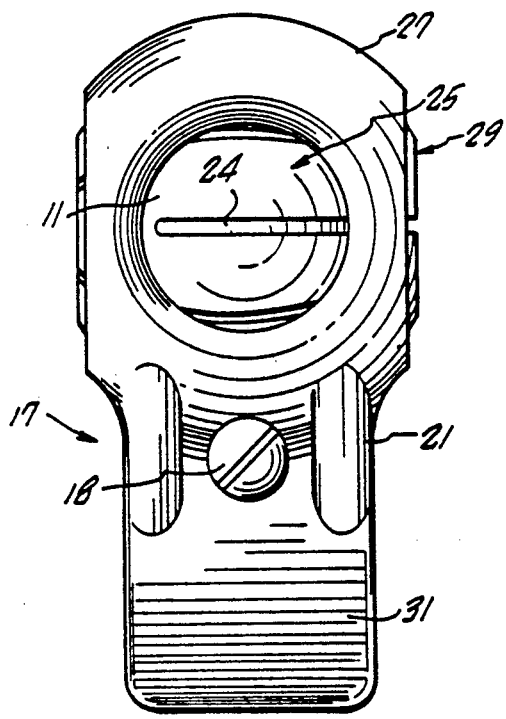
FIG. 7 is a side view of an assembly of the present invention made wih a plastic material.
Figure 8:
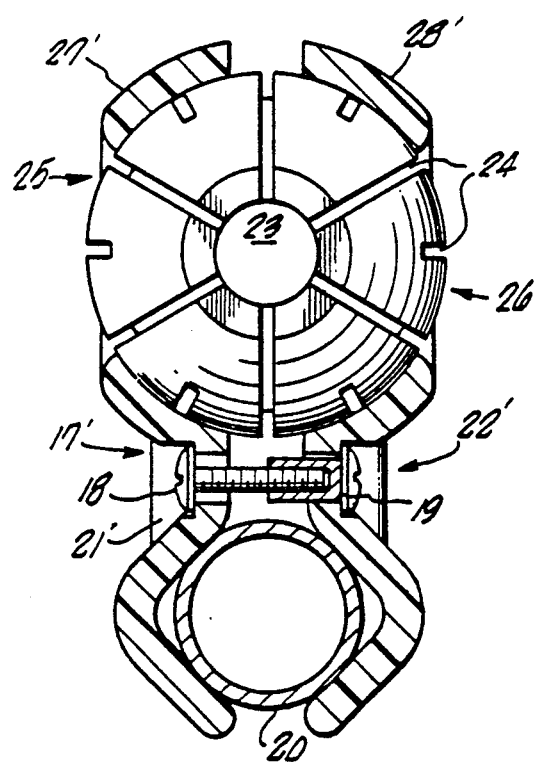
FIG. 8 is a cross sectional, side view of the FIG. 7 assembly with the gripping sphere in place.

By reference to FIGS. 7 and 8 a second preferred embodiment of the present invention is shown. In the FIGS. 7 and 8 embodiment, the mounting bracket material is of a plastic construction. In FIGS. 7 and 8 like parts as shown in FIGS. 1-6 are illustrated with the same reference numerals and lead lines. For example the same truncated spherical gripping member 11 with a cylindrical channel 23 and slots 24 are shown. In FIGS. 7 and 8 like parts having the different, or plastic material of construction are shown with a prime designation after the numeral. Thus for example the forward housing unit is labeled as $27^1$ and the rearward housing unit is designated as $28^1$. As shown in FIG. 8 the midregion $17^1$ is formed with recesses sized to accommodate the male portion 18 and female portion 19 of the male/female screw fastener. The head of the screw also has a slot dimensioned to accept a popular coin of a desired country, for example a U.S. quarter. Reinforcing ribs $21^1$, $22^1$ as shown in FIGS. 7 and 8 provide an additional measure of support between the upper and lower regions of the clamp assembly. The thickness of the housing members $27^1$ and $28^1$ are not critical, provided that the thickness provides sufficient strength and support for the mounting bracket and the contained gripping member 11. As may be noted by comparing FIGS. 2 and 8, the FIG. 8 housing members $27^1$ and $28^1$, when made of the plastic material, are thicker than the members 27 when made of metal, as shown in FIG. 2. As also is shown, in FIGS. 1-4 and 7-8 the edges of the housing are rounded off to preclude having sharp or rough edges, and may be rounded or smoothed in a variety of aesthetically pleasing ways, such as shown in corresponding design patent U.S. Pat. No. Des. D308,731.

Figure 9:
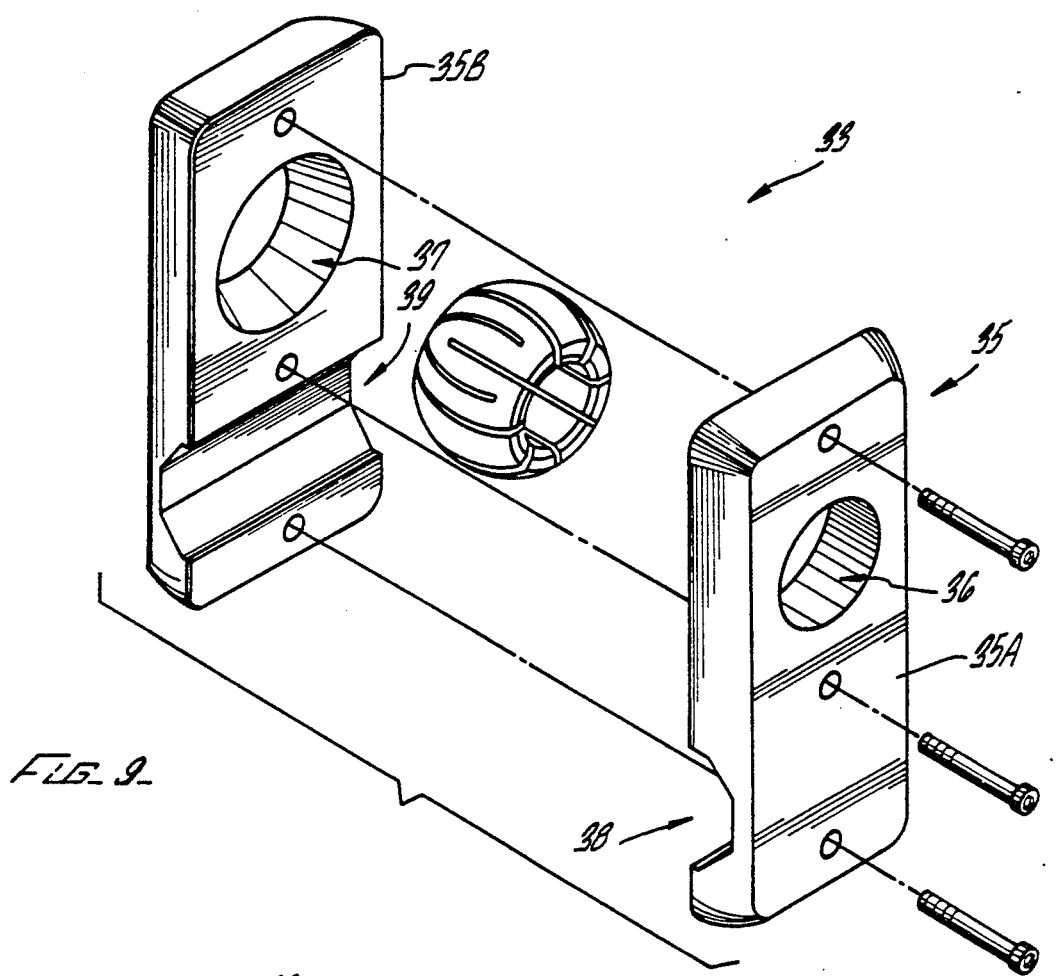
FIG. 9 is an exploded perspective view of a second preferred embodiment of the flashlight holder clamp assembly of the present invention.
Figure 10:
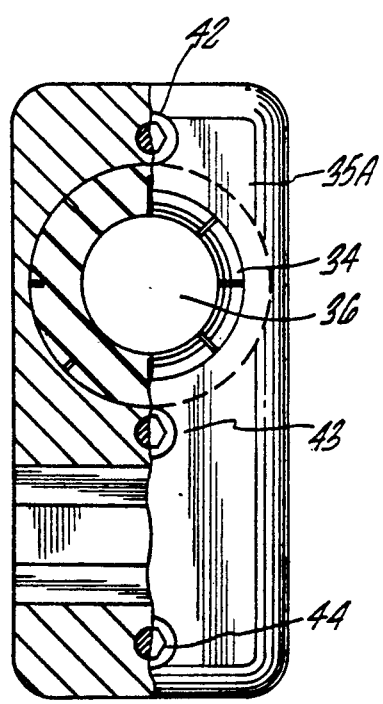
FIG. 10 is a front elevation, partial section view of the FIG. 9 assembly.
Figure 11:
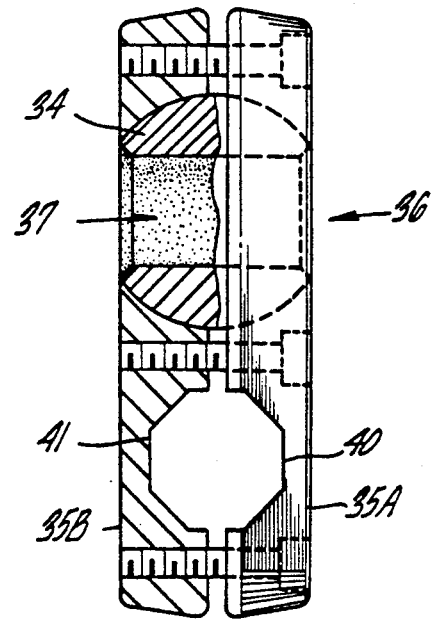
FIG. 11 is a sidee elevation, partial section view of the FIG. 9 assembly.

Referring to FIGS. 9-11 a second preferred embodiment will be described. The alternate assembly is generally shown at 33 and comprises a truncated spherical gripping member 34 and a mounting bracket 35. The gripping member 34 is like that previously described with respect to FIGS. 1-8. The mounting bracket 35 provides for one pair of upper aligned apertures 36 and 37, with aperture 36 disposed in body portion 35A of mounting bracket 35 and with aperture 37 disposed in body portion 35B. The mounting bracket 35 also provides for one pair of lower aligned apertures 38 and 39, with a portion of each of the apertures defined by the body portions 35A and a portion defined by the body portion 35B. As shown in FIG. 10 one portion 40 is defined in body portion 35A and one portion 41 is defined in body portion 35B. The lower pair of aligned apertures are oriented at 90° with respect to the upper pair of aligned apertures, as illustrated in FIGS. 9-11. This embodiment features simplicity of construction and is intended for use where the beam of light is to be directed generally at right angles from the direction of the axis of the support member. Conventional fittings 42, 43 and 44 and materials of construction as described above may be used with this embodiment. The functions of the preferred embodiment of FIGS. 9-11 may be accomplished with a variety of designs, shapes and styles.

Figure 12:
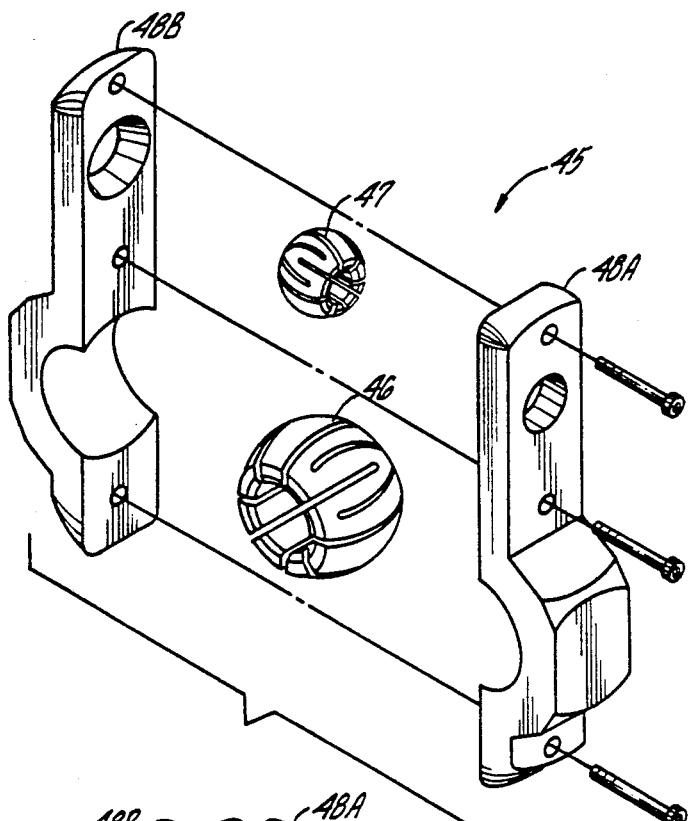
FIG. 12 is an exploded perspective view of a third preferred embodiment of the flashlight holder clamp assembly of the present invention.
Figure 13:
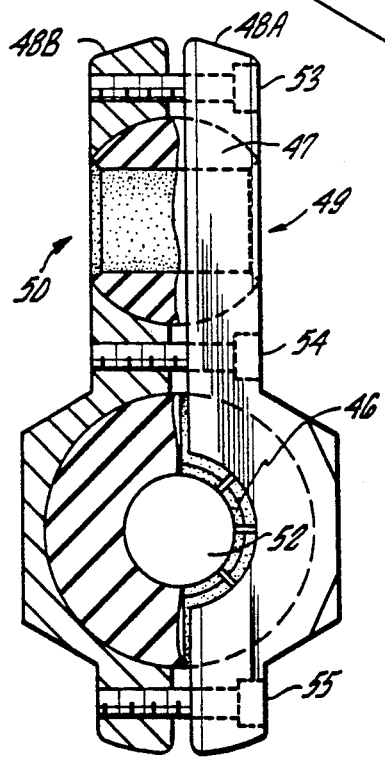
FIG. 13 is a side elevation, partial section view of the FIG. 12 assembly.
Figure 14:
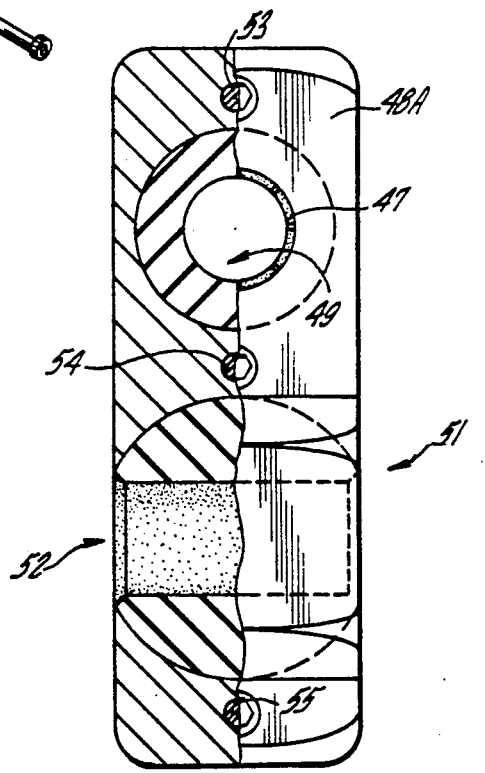
FIG. 14 is a front elevation, partial section view of the FIG. 12 assembly.

Referring to FIGS. 12-14 a third preferred embodiment will be described. This alternate assembly is generally shown at 45 and comprises two truncated spherical gripping members 46 and 47 positioned in a mounting bracket 48. Gripping members 46 and 47 are like that previously described with respect to FIGS. 1-11. The mounting bracket 48 provides for one pair of upper aligned apertures 49 and 50, with aperture 49 disposed in body portion 48A of mounting bracket 48 and with aperture 50 disposed in body portion 48B. The mounting bracket also provides for accommodation of lower gripping member 46, which may be of the same or a different size than the upper gripping member 47, and for a pair of lower aligned apertures 51 and 52. As shown in FIGS. 9-14, the lower apertures are each defined by a portion of the body portions 48A and 48B.

The materials of construction and fittings or fastening means 53, 54 and 55 are as described above with reference to FIGS. 1-11.

The embodiment of FIGS. 12 to 14 provide means for the additional functions for easy and significant rotational and/or other adjustment of the assembly with respect to the axis of the support member. This is accomplished through provision of the lower spherical member 46 and the lower aligned apertures 51 and 52.

Referring to FIGS. 15 to 17 a fourth preferred embodiment will be described. This alternate assembly has upper and lower truncated spherical gripping members 56 and 57, and as described above with respect to the third preferred embodiment. The fourth preferred embodiment also provides for two pairs of upper aligned apertures and two pairs of lower aligned apertures for maximum adjustment of the flashlight beam direction with respect to the axis of the support structure. The upper aligned apertures are shown at 58, 59, 60 and 61 and are mutually perpendicular. The lower aligned apertures are shown at 62, 63, 64 and 65 and are also mutually perpendicular. Fasteners are shown at 66, 67, and 68 and are of the type described previously. Materials of construction are also as described previously. Slot 69 provides for holding a security wrench, such as a right angle, hex allen wrench, as shown in FIG. 15. A plastic sleeve may also be provided in the slot 69 to aid in holding the security wrench.

In the embodiment shown in FIGS. 15 to 17, the clamp assembly may be affixed to the support structure to either pair of lower aligned apertures and, due to the lower spherical gripping member feature, may also be adjusted rotationally and/or at other angles with respect to the axis of the support member. As described above with respect to FIGS. 1-8, the flashlight may be affixed to extend through either pair of upper aligned apertures and may also be radially and/or pivotally adjusted laterally with respect to the clamping assembly mounting bracket. Thus, this embodiment provides for a maximum adjustment of flashlight beam direction with respect to the axis of the support structure used.

The functions of the three embodiments shown in FIGS. 9-17 may be accomplished with various designs, shapes and overall configurations. The specific shapes, styles and overall configurations shown in FIGS. 9-17 are subject matter of commonly assigned U.S. patent application Ser. No. 537,446.

Although the preferred embodiments show a single fastening means such as a male/female screw fastener which accomplishes both functions of holding the housing pieces of the mounting bracket 12 together so that it may be clamped onto a tubular member such as a bicycle handlebar 20, and of constricting the gripping member 11 around the flashlight barrel at channel 23 to achieve a gripping effect, the flashlight holder clamp may be constructed with other fastening means which perform these functions. Also, the mounting bracket may be constructed so that different fastening means perform each of these separate functions. For example the mounting bracket may have one fastening means to clamp onto the held device, such as the bicycle handlebar while a second clamping means could be used to tighten down on the gripping member 11. These alterations are also considered to be within the scope of the present invention, although they are not specifically set forth with drawings herein.

While preferred embodiments of the herein invention have been described, numerous modifications, alterations alternate embodiments and alternate materials may be contemplated by those skilled in the art and may be utilized in accomplishing the objects of the present invention. It is envisioned that all such alternates are considered to be within the scope of the present invention as defined by the appended claims.

We claim:

1. A flashlight holder clamp assembly for adjustably securing a flashlight to a support member, said assembly comprising:

an elastomeric generally spherically-shaped gripping member, said member defining a cylindrical channel extending centrally therethrough adapted to receive a portion of a flashlight therein and defining a plurality of uniformly spaced longitudinal slots communicating with said channel;

a mounting bracket having a forward portion and a rearward portion, said forward portion being disposed adjacent said rearward portion and defining therewith a first pair of gripping surfaces and a second pair of gripping surfaces, said first pair of gripping surface being adapted to engage said gripping member and said second pair of gripping surfaces being adapted to engage said support member; and means for constricting the forward and rearward portions of said mounting bracket to constrict said gripping member between said first pair of gripping surfaces about a portion of the flashlight and to clamp said second pair of gripping surfaces onto the support member whereby the flashlight is secured to the support member in a desired angular orientation with respect thereto;

wherein said first pair of gripping surfaces define a substantially spherical receiving area for said gripping member and for uniformly engaging said gripping member over a substantial portion of the outer surface of said member such that upon said first pair of gripping surfaces being constricted by said constricting means, said gripping member is uniformly constricted about said channel; and wherein said forward and rearward portions of said mounting bracket define an upper pair of axially aligned apertures therein, the diameter of each of said apertures being larger than the cross-sectional diameter of said centrally disposed channel, and a lower pair of axially aligned apertures therein being perpendicularly disposed with respect to the upper pair of apertures.

* * * * *